United States Patent
Ortiz Rodriguez et al.

(10) Patent No.: US 9,804,994 B2
(45) Date of Patent: Oct. 31, 2017

(54) APPLICATION ARCHITECTURE SUPPORTING MULTIPLE SERVICES AND CACHING

(71) Applicant: Microsoft Technology Licensing, LLC, Redmond, WA (US)

(72) Inventors: Carlos Omar Ortiz Rodriguez, Issaquah, WA (US); Filip Jerzy Gorski, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 776 days.

(21) Appl. No.: 13/869,943

(22) Filed: Apr. 24, 2013

(65) Prior Publication Data

US 2014/0280493 A1 Sep. 18, 2014

Related U.S. Application Data (60) Provisional application No. 61/786,395, filed on Mar. 15, 2013.

(51) Int. Cl.
*G06F 15/16* (2006.01)
*G06F 15/167* (2006.01)
(Continued)

(52) U.S. Cl.
CPC .......... *G06F 15/167* (2013.01); *G06F 9/5072* (2013.01); *G06F 9/541* (2013.01); *H04L 67/2842* (2013.01)

(58) Field of Classification Search
CPC G06Q 30/0241; G06Q 30/0277; H04L 67/02; H04L 67/28; H04L 67/16;
(Continued)

(56) References Cited

U.S. PATENT DOCUMENTS 7,277,914 B2 * 10/2007 Takeshima ........ G06F 17/30861
707/E17.107
7,620,729 B2 * 11/2009 Moss ...................... H04L 63/10
370/230
(Continued)

FOREIGN PATENT DOCUMENTS

EP 1059595 A1 12/2000

OTHER PUBLICATIONS

"International Search Report & Written Opinion for PCT Patent Application No. PCT/US2014/026924", Mailed Date: Jul. 10, 2014, Filed Date: Mar. 14, 2014, 9 Pages.
(Continued)

*Primary Examiner* — Edward Kim
(74) *Attorney, Agent, or Firm* — Christopher J. Volkmann; Kelly, Holt & Christenson, PLLC (57) ABSTRACT

A service agent provides an interface for the actions that a client application needs to perform against a server. The service agent selects an appropriate service implementation based on configuration information. The service implementation is associated with a particular service version or source. A number of service implementations are available to the service agent. The service agent also creates a cache service instance that is compatible with the service instance. The client application makes data requests through the service agent. The cache service retrieves requested data from a local storage or from a selected service, if the data is not available locally. The cache service stores an expiration value with the data in the cache. The expiration value is retrieved when data is requested from the cache. The cache data is returned only if the expiration value has not exceeded an expiration policy.

20 Claims, 6 Drawing Sheets

(51) Int. Cl.
*G06F 9/50* (2006.01)
*G06F 9/54* (2006.01)
*H04L 29/08* (2006.01)

(58) Field of Classification Search
CPC ............ G06F 17/30861; G06F 12/084; G06F 12/0897; G06F 3/067
USPC ................ 709/201, 202, 203, 217, 218, 219
See application file for complete search history.

(56) References Cited

U.S. PATENT DOCUMENTS

| | | | | |
|---|---|---|---|---|
| 7,975,020 | B1* | 7/2011 | Green | G06Q 30/0241 705/14.4 |
| 8,117,306 | B1* | 2/2012 | Baumback | H04L 43/0817 709/217 |
| 8,285,681 | B2* | 10/2012 | Prahlad | G06F 17/30082 707/640 |
| 2002/0120505 | A1* | 8/2002 | Henkin | G06Q 30/02 705/14.69 |
| 2004/0044731 | A1* | 3/2004 | Chen | H04L 67/2842 709/203 |
| 2004/0215711 | A1* | 10/2004 | Martin, Jr. | H04L 29/06 709/203 |
| 2005/0267798 | A1* | 12/2005 | Panara | G06Q 30/0264 705/14.61 |
| 2009/0224941 | A1 | 9/2009 | Kansal et al. | |
| 2009/0228545 | A1* | 9/2009 | Mendez | H04L 67/1095 709/202 |
| 2010/0010974 | A1* | 1/2010 | Chieu | G06F 9/5038 707/E17.005 |
| 2011/0066791 | A1* | 3/2011 | Goyal | G06F 12/0866 711/103 |
| 2012/0022942 | A1* | 1/2012 | Holloway | G06Q 30/0241 705/14.49 |

OTHER PUBLICATIONS

Xinogalos, et al., "Recent Advances Delivered by HTML 5 in Mobile Cloud Computing Applications: A Survey", In Proceedings of the Fifth Balkan Conference in Informatics, Sep. 16, 2012, pp. 199-204.
Chadwick, et al., "Chapter 12: Caching", In Book—Programming asp.net MVC 4—Developing Real-World Web Applications with asp.net MVC, An O'Reilly Media Publication, Sep. 1, 2012, 16 Pages.
Stewart, Brian J., "Using the HTML5 IndexedDB API," (downloaded from http://www.ibm.com/developerworks/library/wa-indexeddb/index.html on Mar. 15, 2013), Dec. 11, 2012, (11 pages).
Microsoft, "Caching Architecture Guide for .NET Framework Applications," Managing the Contents of a Cache, (downloaded from http://msdn.microsoft.com/en-us/library/ee817650.aspx on Mar. 15, 2013), 2013, (18 pages).
Microsoft, "Implementing Page Cache in asp.net Using Absolute Expiration," (downloaded from http://msdn.microsoft.com/en-us/library/ff649217.aspx on Mar. 15, 2013), 2013, (5 pages).
Nangia, Suneet, "Expiration and Eviction (Windows Server AppFabric Caching)," (downloaded from http://msdn.microsoft.com/en-us/library/ee790981(v=azure.10).aspx on Mar. 15, 2013), May 30, 2012, (4 pages).
Gadkari, Abhijit, "Caching in the Distributed Environment," (downloaded from http://msdn.microsoft.com/en-us/library/dd129907.aspx on Mar. 15, 2013), 2013, (15 pages).
W3C, "Indexed Database API," W3C Working Draft May 24, 2012, (85 pages).

* cited by examiner

APPLICATION ARCHITECTURE SUPPORTING MULTIPLE SERVICES AND CACHING

BACKGROUND

Client applications that access a remote backend service are typically tightly coupled to that service. Each version of the service may require an update to the client application. For example, depending upon the version of the service that a user accesses, the client application architecture may need to change to reflect different capabilities in different versions. This may also result in different user interfaces being presented to the user depending upon which service is being accessed.

Existing attempts to address this issue require different versions of the client application that are each tied to specific versions of the service. However, this requires more maintenance because different versions of the product must be maintained.

The client application typically requires data from a server during runtime. Calls to a remote server can add a delay to the application due to the time required to obtain the requested information. Additionally, calls to the server unnecessarily add to network traffic each time the same information is requested. Many client applications will cache certain data that is used often or that was recently requested. By accessing a local cache for this data, the client application can reduce the number of calls to the server. However, a problem arises if the data has been in the cache for too long and has become "stale."

Known solutions to this problem, such as always going to the server for data or storing data locally, have disadvantages. If data is always retrieved from the server, the application will increase network traffic and will suffer a performance reduction due to network delays. If a local storage is used for the server data, then the client application would be tied to one platform. The application would need to be rewritten if it was to run on another platform.

The client application could query the server to check if the cache data was stale, but such a system would also increase network traffic. One call would be made for every data read to verify currency of the data, and often a second call would have to be made to retrieve new data. Such increased network traffic would reduce the performance of the application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide an interface for client applications that accesses services on remote servers. The interface allows a user and a selected service to interact, such as initiating actions by the service and responding to user requests. The interface uses a service agent that selects the proper service implementation based on the configuration of the client application. The service agent allows a developer to release application updates that support new versions of the service, new services, or support for new servers while maintaining caching, storage, and user interface operation agnostic of the underlying service.

The service agent creates an abstraction that allows a presentation client to work with different versions of the remote service, such as updates to existing services or competitor services that offer the same conceptual entities and actions. For example, an expense application that works with different versions of a particular backend service, with competitor backend expense services, or in a demonstration mode without changing user interface components or the base architecture of the client.

Embodiments of the invention enable a scenario in which a user may use the application in an offline or demonstration mode instead of accessing a live backend service. The service agent selects a demonstration implementation instead of connecting the user interface to the live service. The demonstration mode provides a service implementation that mocks actual service operations and, therefore, the rest of the application would work as if connected to the live service.

Embodiments of the invention also provide a caching framework that allows the client application to store data and then efficiently query for that data. The caching framework determines when the data in the cache is stale and should not be used by the application. In one embodiment, the caching service is provided on top of a web browser standard interface for databases, such as indexedDB. The user may specify how long stored data will be valid. A consuming application receives an indication of the lifespan of the cached data and can determine whether to use the cache data or to retrieve updated data from the service.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
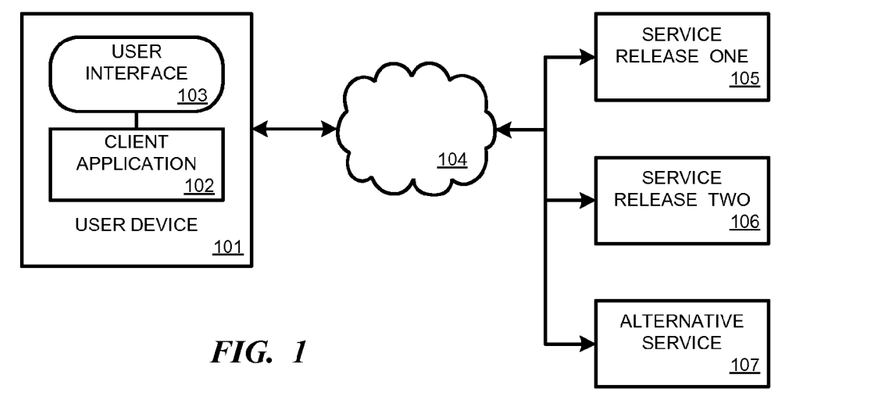
FIG. 1 is a block diagram illustrating components of a system implementing a service agent and cache architecture according to one embodiment.

FIG. 1 is a block diagram illustrating components of a system implementing a service agent and cache architecture according to one embodiment. User device 101 may be a computer, laptop, tablet, smartphone, or any other computing device that runs one or more client applications 102. A user access the client application 102 through user interface 103. The user may provide inputs to the client application through user interface 103, such as using text entry, manual button activation, touch screen actions, voice or audio signals, or other inputs. The interface may also provide information output to the user, such as by using text, graphics, audio, video or other displays.

Client application 102 provides access via a network 104 to one or more remote services. Network 104 may be an Intranet, internet, or any public or private data network. Client application 102 may be designed to work with a service 105 that is available via network 104. For example, any exposed web services may accessed by client application, such as financial, accounting, time tracking, educational, data storage, information retrieval, personnel, social media, or other services. The service 105 may be hosted on a private or enterprise network or on a cloud computing environment or other distributed computing system. The user interface 103 is adapted to interact with the features and operations available from service 105.

If the service provider later develops an updated service 106, such as a second release or new version of the service, then client application 102 may or may not be compatible with this version. For example, release two 106 may introduce new features, may lack features of release one 105, or may modify client application interaction. In some embodiments, client application 102 must be changed or replaced for the user device to access service release two 106. Even if client application 102 can access service release two 106, the user interface 103 supported by client application 102 may not be configured properly for this service.

Alternative service 107 may also be available through network 104. Alternative service 107 may offer a similar set of features to service release one 105 or two 106, such as a similar accounting or educational application, but may originate from a competitor. Client application 102 may be able to access alternative service 107, for example, through a standardized interface, but the user interface may not be adapted to interact with the alternative service 107.

Embodiments of the invention provide a user interface 103 that is agnostic to the implementation of the remote service 105-107. The user interface 103 as disclosed herein does not have to be tightly coupled to the selected service. Instead, a service agent is used to determine what service has been connected to the client application. The service agent then decides which service implementation to invoke. This allows the user interface 103 to be written once, but used with multiple versions or sources of the remote service.

Figure 2:
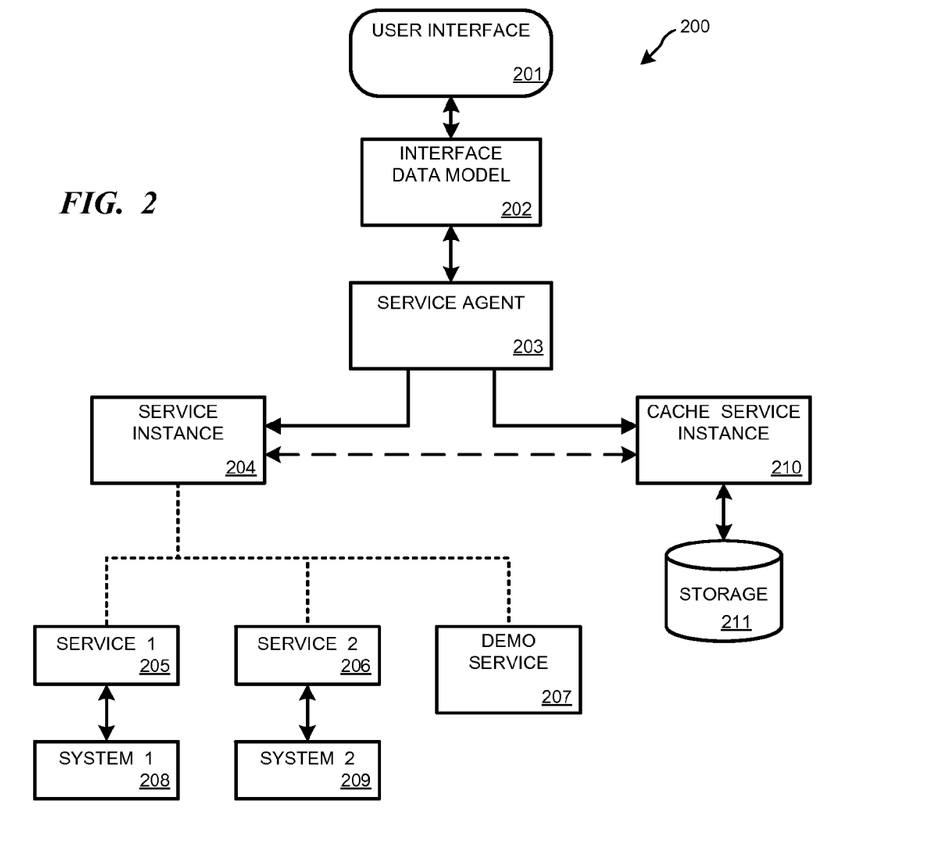
FIG. 2 is a block diagram of a system illustrating use of a service agent according to one embodiment.

FIG. 2 is a block diagram of a system 200 illustrating use of a service agent according to one embodiment. A user interface 201 accepts user inputs and provides output information to the user. In one embodiment, user interface 201 is coupled to a service selected by the user. For example, when the user runs a business or educational application, user interface 201 allows the user to interact with the selected application. The application may use a remote service, such as to retrieve and store data. Interface data model 202 is a component of user interface 201 that provides the capability for user interface 201 to interact with the remote service.

In prior systems, interface data model 202 is tightly coupled to the remote service and has the intelligence required to interact with that specific service. As noted above, such a strict coupling between the user interface and the service will prevent the user from accessing other services using this interface.

In system 200, interface data model 202 is coupled to service agent 203, which holds an instantiation 204 of the service implementations for the selected service and application. This allows the application to interact with multiple versions of a service while using the same interface for each version. Any user interface or other components needed by the client application interact with service agent 203 whenever they need data. Service agent 203 provides a level of abstraction between the client application and the source of the data.

The client application may be capable of working with a number of similar services 205, 206 to obtain data. For example, service 205 may be a business service from one provider, while service 206 is a later release or version of service from the same provider. Alternatively, service 206 may be a similar business service offered by a different provider. The services 205 and 206 may use different APIs or may have different mappings to the client application user interface. Demo service 207 is standalone version of the business service, such as a demonstration or test version. For example, the user may access demo service 207 to evaluate features offered by the client application.

Depending upon the service (205-207) that the user wants to access, service agent 203 loads the appropriate implementation as service instance 204 at runtime. The user may designate the desired service (205-207) in a user profile or in configuration settings for the application. Once loaded at runtime, service agent 203 uses the designated service instance 204 to access the selected system 208 or 209.

Service agent 203 also makes access to the cache transparent to user interface 201 and interface data model 202. When user interface 201 requires data, it requests the data from interface data model 202, which in turn requests the data from service agent 203. In this way, user interface 201 and interface data model 202 do not need to know whether the data is obtained from a local cache or from the selected system 208, 209.

Service agent 203 loads an instance 210 of cache service that corresponds to the selected service instance 204. The cache service instance 210 provides an implementation that is compatible with the selected service. Cache service instance 210 is responsible for getting data from storage 211. Cache service instance 210 may access any appropriate storage 211, such as file storage, local memory, a SQL database, or the like.

In some cases, a selected service instance 204 may not have a defined cache for that entity. In other cases there may be no data in the cache 211. When there is no cache or the cache returns no data, then cache service instance 210 will send the appropriate service call for the selected service to service instance 204. The cache service instance 210 knows the appropriate service call for service instance 204 based upon the original data call passed in from service agent 203. Service instance 204 will obtain the requested data and return it to cache service instance 210, which will then return the data to service agent 203. Cache service instance 210 will then store the data in cache 211 if applicable. Service agent 203 passes the data to interface data model 202 and user interface 201.

This configuration ensures that the user interface receives the requested data without having to know if the data is coming from a local cache or a remote system. The service agent 203 knows that it will receive the requested data from cache service instance 210. It is the responsibility of cache service 210 to get the data from storage 211, if it is available, or from system 208, 209, if the data is not available locally.

Figure 3:
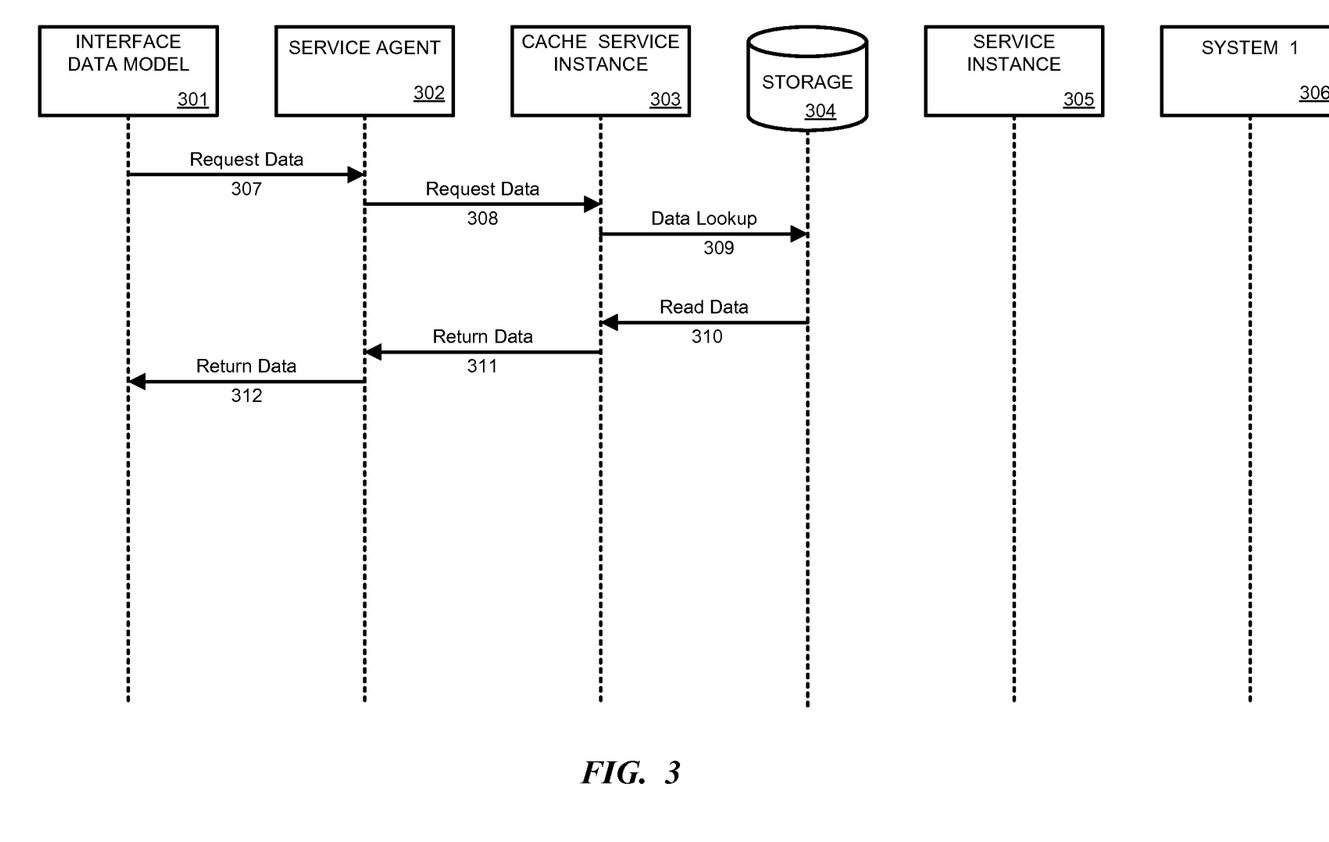
FIG. 3 illustrates a message flow through a system employing a service agent to retrieve requested data.

FIG. 3 illustrates a message flow through a system employing a service agent to retrieve requested data. The interface data model 301 is aware of service agent 302, but does not need to know what is beyond that level. Service agent 302 has implemented service instance 305 for the system configured by the client application on start up. Service agent 302 has also implemented cache service instance 303, which is configured to operate with the selected service instance 305. Cache service instance 303 uses storage 304 as appropriate to the selected remote system 306 and the available local storage.

When data is required by the user interface, interface data model 301 sends a data request 307 to service agent 302 to retrieve that data. Interface data model 301 does not need to know how (i.e., directly or indirectly) or where (i.e., locally or remotely) service agent 302 obtains the data. Instead, service agent 302 can expose a standard interface to model 301 without requiring changes for the specific system 306 being used.

Service agent 302 sends data request 308 to cache service instance 303, which looks for the data in storage 304. If the data is available in storage 304, then the data is read out in message 310. Cache service instance 303 may perform checks on the data in message 310, such as verifying the accuracy and/or validity of the data. Once valid data has been received at cache service 303, it returns the requested data in message 311 to service agent 302. Service agent 302 then returns the data in message 312 to interface data model 301 in response to the original request 307.

Figure 4:
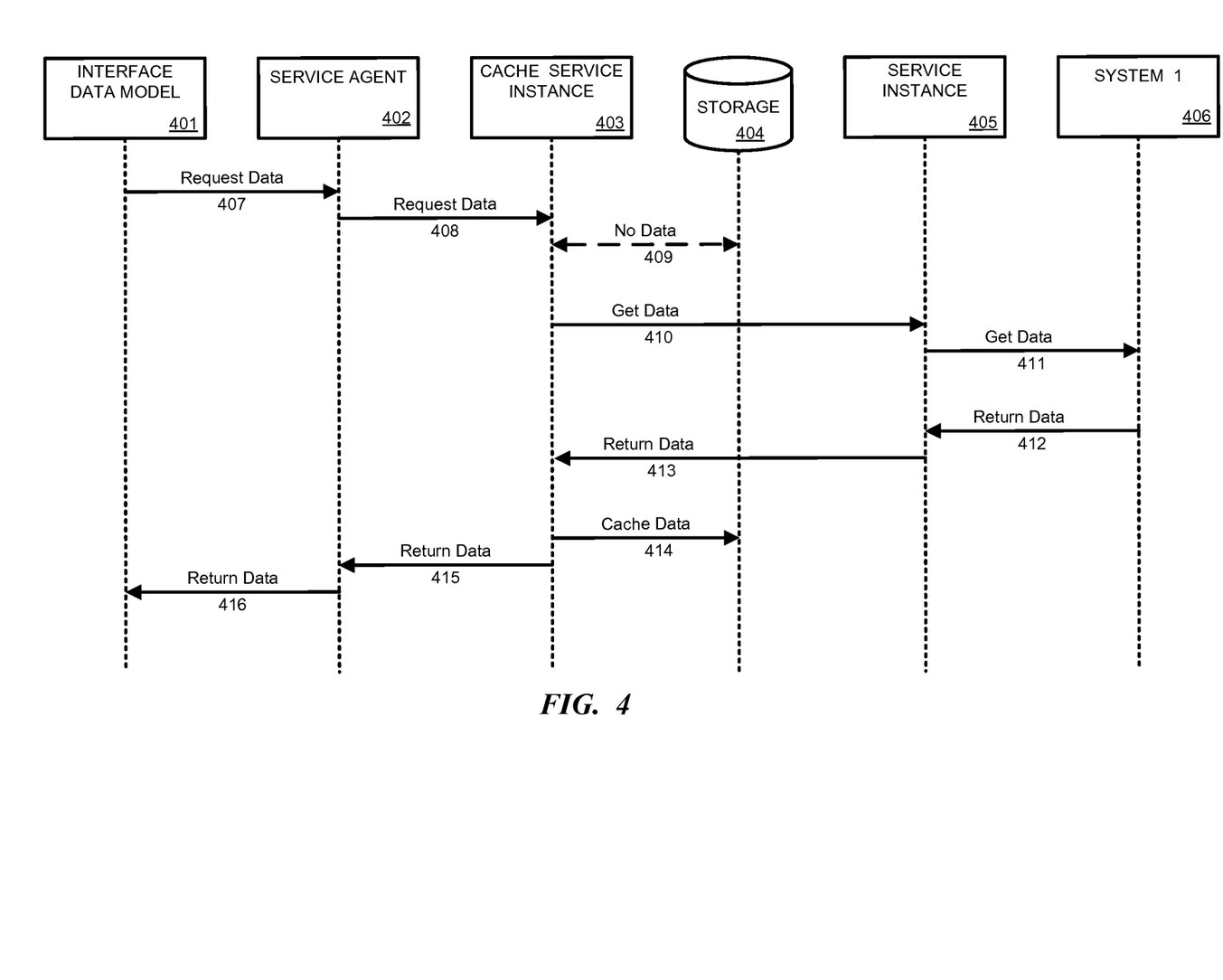
FIG. 4 illustrates an alternative message flow through a system employing a service agent to retrieve requested data when the data is not available on a local storage.

FIG. 4 illustrates an alternative message flow through a system employing a service agent to retrieve requested data when the data is not available on a local storage. When data is required by the user interface, interface data model 401 sends a data request 407 to service agent 402 to retrieve that data. Service agent 402 sends data request 408 to cache service instance 403, which first looks for the data in storage 404. Depending upon the type of information requested, cache service instance 403 may know that the data is not available in storage 404. Alternatively, cache service 403 attempts to read the requested data, but receives a failure message 409 in response from storage 404.

If the data is not available in storage 404, then cache service instance 403 sends a get data call to service instance 405. Service instance 405 sends a get data request to system 406 using the appropriate call for that system. The request to service instance 405 is not exposed to service agent 402, which only has to make one data request to cache service instance 403.

System 406 obtains the requested data and then returns the data to service instance 405 in message 412. Service instance 405 forwards the data to cache service instance 403 in message 413.

Once valid data has been received at cache service 403, it returns the requested data in message 415 to service agent 402. Cache service instance 403 also stores the data to a local storage 414 so that the data will be locally available for future requests.

Service agent 402 returns the data in message 416 to interface data model 401 in response to the original request 407. This configuration allows interface data model 401 to access a single service agent 402 to obtain data without regard to the underlying system being used. Similarly, service agent 402 can make a single request to cache service instance 403 to get the data. If the data is not available locally, cache service instance 403 will fetch the request data from the remote system 406 and returns that data without requiring further action from the service agent 402.

In one embodiment, the cache service may be provided on top of a web browser standard interface for a local database, such as an indexed database API or the W3C standard IndexedDB. Using Indexed DB, an application built using HTML5 and Javascript can manage its caching needs. The cache service may be built on IndexedDB, which provides a standard way of managing cache data effectiveness. By providing this standard cache interface, client applications do not have to implement their own specific cache storage.

Additionally, the cache service can add an expiration policy setting for the cache data.

A new cache API, IndexedDBCache, may be defined to represent a cache's storage. Operations may be defined for the cache service, for example:

getEntities( )—returns all records stored in the cache that are still valid;

getEntityByKey(key)—returns a record that matches the key, if the record is in the cache and still valid;

cacheEntities(entities[ ])—inserts the entities passed in and calculates their expiration date time value and stores the expiration value; and hasCachedEntities( )—returns true if there are values in the cache that are still valid.

When a new instance of IndexedDBCache is created, the calling application is in charge of specifying the expiration policy for the cache. For example, the application may define an expiration policy wherein the stored values are valid for a number of minutes, hours, days, weeks, or longer. This expiration policy is then used when storing and reading items from the cache.

Figure 5:
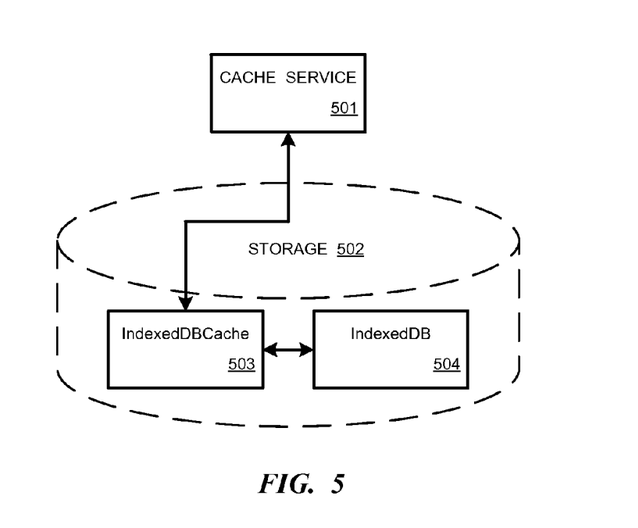
FIG. 5 is a block diagram illustrating how IndexedDB-Cache uses the IndexedDB to provide cache storage in one embodiment.

FIG. 5 is a block diagram illustrating how IndexedDB-Cache uses the IndexedDB to provide cache storage in one embodiment. The IndexedDB specification allows the cache to be implemented for different platforms to store both the cache data and the expiration time for the cache data.

Cache service instance 501 creates a local store 502 by calling an IndexedDBCache instance 503, which then utilizes an IndexedDB implementation 504 to store, manage and persist data in storage 502. Accordingly, when a service agent or other application calls cache service 501 to store or retrieve data, cache service 501 creates instances of IndexedDBCache 503 and manages that cache by calling getEntities, hasCachedEntitites, and cacheEntities. Data is stored by IndexedDBCache 503 in IndexedDB 504.

When cache service 501 sends cacheEntities(entities[ ]), IndexedDBCache 503 calculates the expiration date/time value for the data being cached. The expiration date/time value is based on the current date/time and the expiration policy configured for IndexedDBCache 503. For example, if cache service has configured IndexedDBCache 503 so that data is only valid for one day, and the cacheEntities(entities[ ]) call is made on 01/01/2013 at 10:00 PM, then the expiration date is calculated to be 01/02/2013 at 10:00 PM. This expiration value is stored in a separate IndexedDB 504 store that is named <storeName>_expiration.

When cache service 501 needs data from the cache 502, it will call getEntities( ) or getEntityByKey(key) to IndexedDBCache 503. In response, IndexedDBCache 503 compares the stored expiration date/time with the current date/time. If the current date/time is less than the expiration value, then the values in the cache are returned. Otherwise, if the current date/time is past the expiration value, then IndexedDBCache 503 will return an empty value.

The expiration policy is a function of time that can be configured to any future date/time. The expiration policy may also be set to "never." In that case, IndexedDB 504 will never cause the data to expire and, therefore, IndexedDB 504 will always return the data if it exists.

Figure 6:
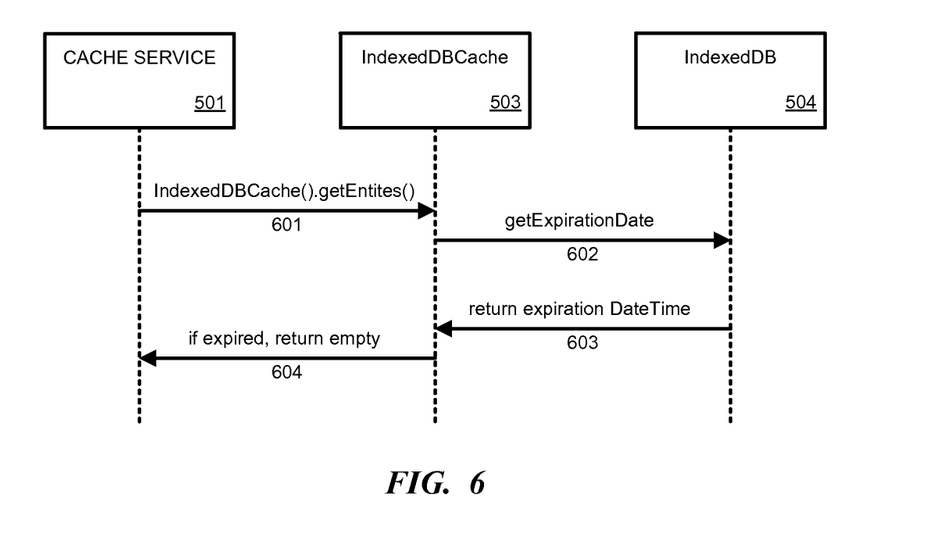
FIG. 6 illustrates a process flow that occurs when IndexedDBCache is asked for data by the cache service and the data has expired.

FIG. 6 illustrates a process flow that occurs when IndexedDBCache is asked for data by the cache service and the data has expired. Cache service 501 sends the call IndexedDBCache.getEntites( ) 601 to IndexedDBCache 503, which then sends the call getExpirationDate 602 to IndexDB 504. IndexDB 504 returns the expiration date/time in message 603. IndexedDBCache 503 then compares the expiration date/time to its expiration policy. If the expiration date/time has exceeded the expiration policy, then IndexedDBCache 503 returns empty call 604 to cache service 501.

In response to receiving an empty response 604, cache service 501 may obtain the requested data from a remote service or system as described above.

Figure 7:
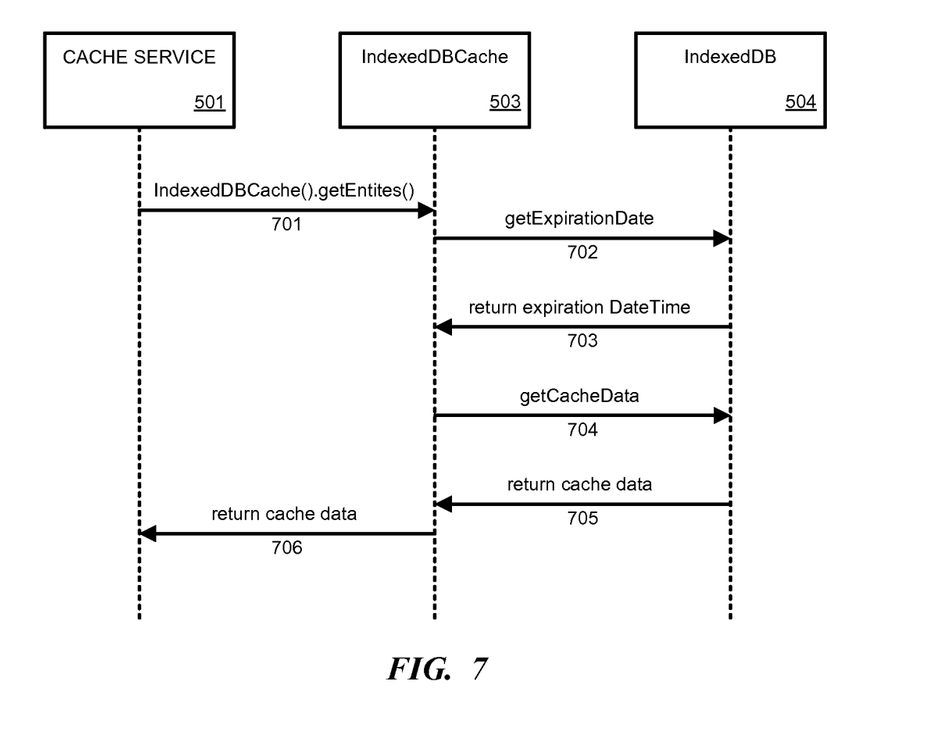
FIG. 7 illustrates a process flow that occurs when IndexedDBCache is asked for data by the cache service and the data has not expired.

FIG. 7 illustrates a process flow that occurs when IndexedDBCache is asked for data by the cache service and the data has not expired. Cache service 501 sends the call IndexedDBCache.getEntites( ) 701 to IndexedDBCache 503, which then sends the call getExpirationDate 702 to IndexDB 504. IndexDB 504 returns the expiration date/time in message 703. IndexedDBCache 503 then compares the expiration date/time to its expiration policy. If the expiration date/time has not exceeded the expiration policy, then IndexedDBCache 503 sends the call getCacheData 704 to IndexDB 504.

IndexDB 504 returns the cache data in message 705 to IndexedDBCache 503, which in turn sends the cache data in message 706 to cache service 501. Cache service 501 may then send the requested data to a calling application, such as a service agent as described above.

Figure 8:
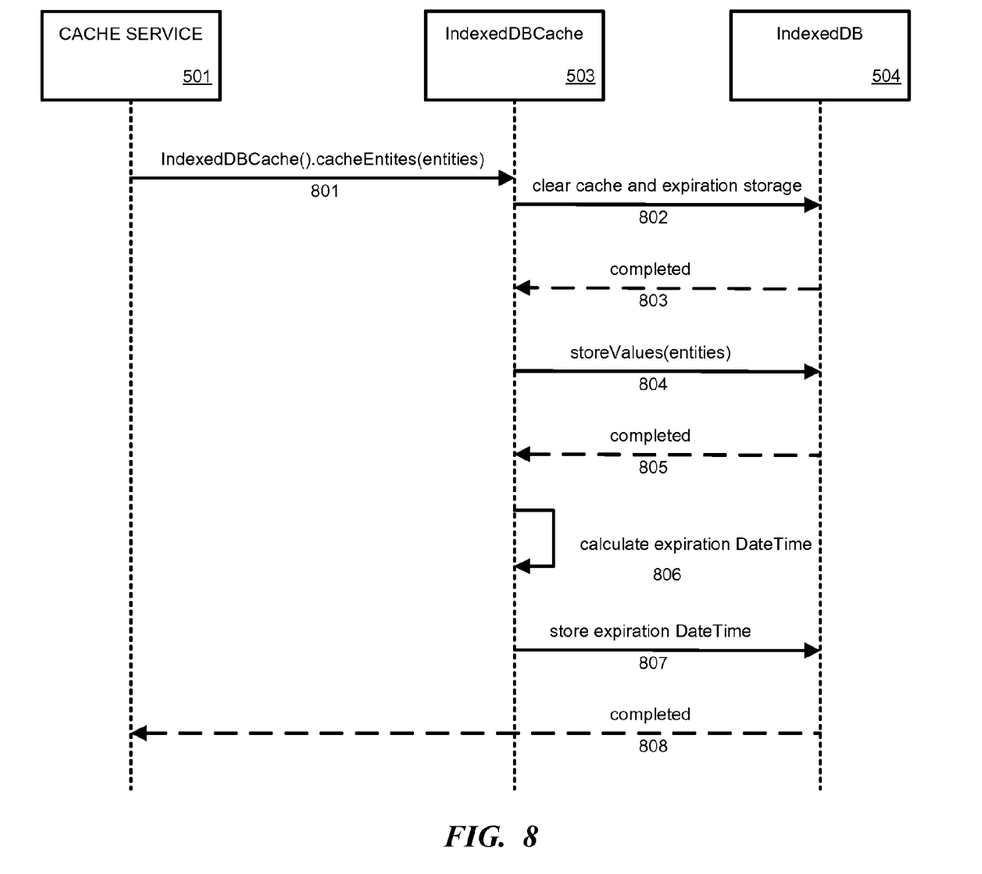
FIG. 8 illustrates a process flow that occurs when IndexedDBCache is given data to cache.

FIG. 8 illustrates a process flow that occurs when IndexedDBCache is given data to cache. For example, if cache service 501 has obtained data to be stored from a client application or obtained requested from a remote service or system, then cache service 501 may give that data to IndexedDBCache to cache.

Cache service 501 sends the call IndexedDBCache.cacheEntites(entities) 801 to cache the value of (entities). IndexDBCache 503 then directs IndexDB 504 to clear its cache and expiration storage in message 802. IndexDB 504 indicates that it has cleared the cache and expiration values in message 803.

IndexDBCache 503 then sends the call storeValues(entities) 804 to IndexDB 504 to cache the value of (entities). IndexDB 504 indicates that it has cached the value in completed message 805.

IndexDBCache 503 then calculates an expiration date/time in step 806 and sends an instruction 807 for IndexDB 504 to store the expiration date/time. IndexDB 504 indicates that it has completed the process in message 808, which IndexDBCache 503 sends to cache service 501.

Figure 9:
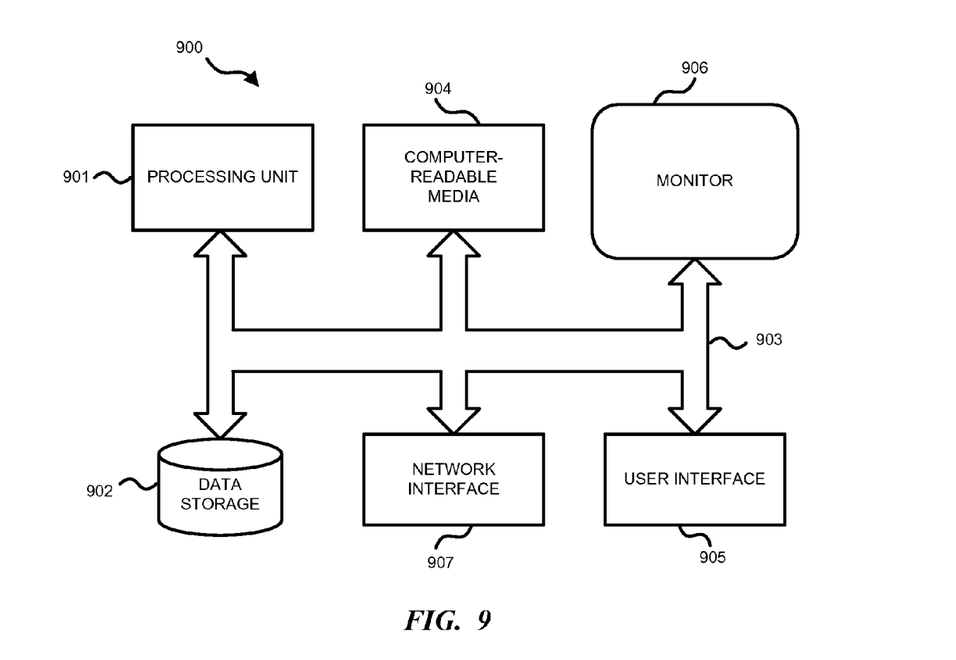
FIG. 9 illustrates an example of a suitable computing and networking environment for hosting the service agent and caching system described herein.

FIG. 9 illustrates an example of a suitable computing and networking environment 900 on which the examples of FIGS. 1-8 may be implemented. The computing system environment 900 is only one example of a suitable computing environment and is not intended to suggest any limitation as to the scope of use or functionality of the invention. For example, computing system 900 may represent user device 101 or services 105-107, in one embodiment. Computing system 900 may also be used to host the interface data model, service agent, service instance, and cache service applications disclosed above.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 900. Components may include, but are not limited to, various hardware components, such as processing unit 901, data storage 902, such as a system memory, and system bus 903 that couples various system components including the data storage 902 to the processing unit 901. The system bus 903 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 900 typically includes a variety of computer-readable media 904. Computer-readable media 904 may be any available media that can be accessed by the computer 900 and includes both volatile and nonvolatile media, and removable and non-removable media, but excludes propagated signals. By way of example, and not limitation, computer-readable media 904 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 902 includes computer storage media in the form of volatile and/or nonvolatile memory such as read only memory (ROM) and random access memory (RAM). A basic input/output system (BIOS), containing the basic routines that help to transfer information between elements within computer 900, such as during start-up, is typically stored in ROM. RAM typically contains data and/or program modules that are immediately accessible to and/or presently being operated on by processing unit 901. By way of example, and not limitation, data storage 902 holds an operating system, application programs, and other program modules and program data.

Data storage 902 may also include other removable/non-removable, volatile/nonvolatile computer storage media. By way of example only, data storage 902 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 9, provide storage of computer-readable instructions, data structures, program modules and other data for the computer 900.

A user may enter commands and information through a user interface 905 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 901 through a user input interface 905 that is coupled to the system bus 903, but may be connected by other interface and bus structures, such as a parallel port, game port or a universal serial bus (USB). A monitor 906 or other type of display device is also connected to the system bus 903 via an interface, such as a video interface. The monitor 906 may also be integrated with a touch-screen panel or the like. Note that the monitor and/or touch screen panel can be physically coupled to a housing in which the computing device 900 is incorporated, such as in a tablet-type personal computer. In addition, computers such as the computing device 900 may also include other peripheral output devices such as speakers and printer, which may be connected through an output peripheral interface or the like.

Monitor 906 and user interface 905 may be use the interface data model described above to retrieve data.

The computer 900 may operate in a networked or cloud-computing environment using logical connections 907 to one or more remote devices, such as a remote computer. The remote computer may be a personal computer, a server, a router, a network PC, a peer device or other common network node, and typically includes many or all of the elements described above relative to the computer 900. The logical connections depicted in FIG. 9 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 900 may be connected to a public or private network through a network interface or adapter 907. In some embodiments, a modem or other means for establishing communications over the network. The modem, which may be internal or external, may be connected to the system bus 903 via the network interface 907 or other appropriate mechanism. A wireless networking component such as comprising an interface and antenna may be coupled through a suitable device such as an access point or peer computer to a network. In a networked environment, program modules depicted relative to the computer 900, or portions thereof, may be stored in the remote memory storage device. It may be appreciated that the network connections shown are exemplary and other means of establishing a communications link between the computers may be used.

Network interface 907 may be used, for example, to access a remote service or system, such as services 205, 206 and systems 208, 209.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
one or more processors; and
a computer-readable storage device having program instructions stored thereon that, upon execution by the one or more processors, provides on the computing device:
a client application comprising a user interface configured to generate a user interface display that receives a user input, wherein the client application is configured to, based on the user input, select a service provided by a server that is remote from the computing device,
wherein the selected service comprises first and second service implementations on the server, the first and second service implementations comprising different implementations of the selected service that each have a different application interface for communicating data from the selected service to the client application, and
wherein the client application is independent of the first and second service implementations; and
a service agent coupled to the client application, the service agent configured to:
receive, from the client application, a request for data from the selected service;

based on the request received from the client application, select one of the first or second service implementations;

create a service instance at runtime that corresponds to the selected service implementation, the service instance providing a service interface that is specific to the application interface of the selected service implementation;

receive, through the service interface, the requested data from the selected service; and create a cache service instance at runtime based on the selected service, the cache service instance providing the requested data to the client application.

2. The computing device of claim 1, wherein the cache service instance is configured to:

store the requested data in a local storage after the requested data is obtained from the selected service;

obtain the requested data from the local storage; and provide the requested data to the service agent.

3. The computing device of claim 2, wherein the cache service instance is configured to obtain the requested data from the selected service if the requested data is not available in a local storage.

4. The computing device of claim 1, wherein the first and second service implementations correspond to different versions of the selected service.

5. The computing device of claim 4, wherein at least one of the different versions of the selected service comprise a demo version of the selected service.

6. A computer-implemented method comprising:

receiving, by a service agent from a client application, a request for data associated with a selected service, wherein the selected service comprises first and second service implementations on a server that is remote from the client application, the first and second service implementations comprising different implementations of the selected service that each have a different application interface for communicating data froms the selected service to the client application, wherein the client application is independent of the first and second service implementations;

selecting one of the first or second service implementations based on the request from the client application;

using the service agent to create a service instance at runtime that corresponds to the selected service implementation, the service instance providing a service interface that is specific to the application interface of the selected service implementation; and using the service agent to create a cache service instance at runtime based on the selected service, the cache service instance being adapted to use the service instance to provide the requested data to the application.

7. The computer-implemented method of claim 6, further comprising:

selecting the service based on initialization of the client application.

8. The computer-implemented method of claim 6, further comprising:

sending the data request to the cache service instance; and wherein the cache service instance comprises an IndexedDBCache instance.

9. The computer-implemented method of claim 6, further comprising:

receiving a data request at the cache service instance, the data request corresponding to a request from the client application; and obtaining requested data from a local storage.

10. The computer-implemented method of claim 6, further comprising:

receiving a first data request at the cache service instance from the service agent;

determining that requested data is not available in a local storage;

sending a second data request from the cache service instance to a remote service using an interface provided by the service instance.

11. The computer-implemented method of claim 10, further comprising:

receiving the requested data at the cache service instance in response to the second data request; and forwarding the requested data to the service agent.

12. The computer-implemented method of claim 10, further comprising:

receiving the requested data at the cache service instance in response to the second data request; and storing the requested data to a local storage.

13. The computer-implemented method of claim 6, wherein the selected service provides a demonstration mode without requiring access to a remote service.

14. The computing device of claim 1, wherein the requested data, received through the service interface, represents data used by the user interface to generate a user interface display that is independent of the first and second service implementations.

15. A computer-implemented method for caching data, comprising:

receiving, by a service agent from a client application, a request for data associated with a service on a server that is remote from the client application, the service comprising first and second service implementations that each have a different application interface for communicating data from the service to the client application;

selecting, by the service agent, one of the first or second service implementations;

creating, by the service agent, a service instance that corresponds to the selected service implementation, the service instance providing a service interface that is specific to the application interface of the selected service implementation;

creating, by the service agent, a cache service instance based on the selected service, the cache service instance being configured to use the service instance to access the service on the server;

retrieving the data from the service through the service interface;

determining an expiration value for the data retrieved from selected service;

using the cache service instance to store the data to a local data store, that is local to the client application, the cache service instance storing the expiration value in association with the data; and using the cache service instance to provide the client application with access to the data in the local data store instance based on the expiration value.

16. The method of claim 15, further comprising:
receiving a second request for the data;
retrieving the expiration value using the cache service instance;
providing the client application with access to the data based on the expiration value.

17. The computer-implemented method of claim 16, wherein providing the client application with access to the data comprises:
comparing the expiration value to an expiration policy associated with the cache service instance;
retrieving the data from the local data store, if the expiration value does not exceed the expiration policy; and
returning an empty response to the second request for the data, if the expiration value exceeds the expiration policy.

18. The computer-implemented method of claim 17, further comprising:
retrieving new data from the remote service on the service, if the expiration value exceeds the expiration policy;
using the cache service instance to store the new data to the local storage; and
storing a new expiration value in association with the new data.

19. The computer-implemented method of claim 15, wherein the cache service instance comprises an Indexed-DBCache instance.

20. The computer-implemented method of claim 15, wherein the first and second service implementations comprise first and second versions of the service, respectively.

* * * * *